(12) United States Patent
Oomori et al.

(10) Patent No.: US 9,994,005 B2
(45) Date of Patent: Jun. 12, 2018

(54) LAMINATED BODY, METHOD FOR PRODUCING THE SAME, AND MOLDED CONTAINER

(75) Inventors: Yumiko Oomori, Tokyo (JP); Kazuko Imai, Brussels (BE); Nao Nishijima, Kasukabe (JP); Akiko Saiki, Koshigaya (JP); Mitsuharu Kimura, Misato (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 1001 days.

(21) Appl. No.: 13/636,443

(22) PCT Filed: Mar. 18, 2011

(86) PCT No.: PCT/JP2011/056542
§ 371 (c)(1),
(2), (4) Date: Sep. 21, 2012

(87) PCT Pub. No.: WO2011/118521
PCT Pub. Date: Sep. 29, 2011

(65) Prior Publication Data
US 2013/0004687 A1 Jan. 3, 2013

(30) Foreign Application Priority Data
Mar. 24, 2010 (JP) ................ P2010-068750

(51) Int. Cl.
*B05D 7/00* (2006.01)
*B32B 1/02* (2006.01)
(Continued)

(52) U.S. Cl.
CPC ............... *B32B 29/06* (2013.01); *B32B 7/12* (2013.01); *B32B 27/10* (2013.01); *B32B 27/32* (2013.01);
(Continued)

(58) Field of Classification Search
CPC ....... Y10T 428/298; Y10T 428/249962; Y10T 442/613; Y10T 442/614; Y10T 442/619;
(Continued)

(56) References Cited

U.S. PATENT DOCUMENTS 5,330,845 A * 7/1994 Andersson ................ B32B 5/26
229/5.81
6,821,373 B1 * 11/2004 Berlin ...................... B32B 27/10
156/244.11
(Continued)

FOREIGN PATENT DOCUMENTS

CN 1594731 A 3/2005
EP 2371892 A1 10/2011
(Continued)

OTHER PUBLICATIONS

Tajedo, Alvaro et al., Why does paper get stronger as it dries, Materials today, vol. 13, Issu 9, Sep. 2010, pp. 42-49.*
(Continued)

*Primary Examiner* — Lee E Sanderson

(57) ABSTRACT

Disclosed is a material that effectively utilizes natural resources and is friendly to the environment as a whole. Specifically, disclosed is a barrier material that has excellent strength and excellent affinity and adhesion to a paper base due to an interaction with paper fibers and that gives sufficient barrier properties even in the form of a thin film. A laminated body (100) includes, on at least one surface of a base (1) made of paper, a fiber layer (2) containing fine cellulose fibers each having a fiber diameter of 1 nm or more and 10 μm or less. In particular, the fine cellulose fibers preferably have a fiber diameter of 1 nm or more and 30 nm or less.

14 Claims, 2 Drawing Sheets

(51) Int. Cl.

| | |
|---|---|
| B32B 23/02 | (2006.01) |
| B32B 23/06 | (2006.01) |
| B32B 29/02 | (2006.01) |
| B32B 29/06 | (2006.01) |
| B32B 7/12 | (2006.01) |
| B32B 27/10 | (2006.01) |
| B32B 27/32 | (2006.01) |
| D21H 27/30 | (2006.01) |
| D21H 27/10 | (2006.01) |
| D21H 17/25 | (2006.01) |
| D21H 19/34 | (2006.01) |
| D21H 19/52 | (2006.01) |
| D21H 15/02 | (2006.01) |

(52) U.S. Cl.
CPC ............ *D21H 17/25* (2013.01); *D21H 19/34* (2013.01); *D21H 19/52* (2013.01); *D21H 27/10* (2013.01); *D21H 27/30* (2013.01); *B32B 2255/12* (2013.01); *B32B 2255/20* (2013.01); *B32B 2255/205* (2013.01); *B32B 2255/28* (2013.01); *B32B 2307/54* (2013.01); *B32B 2307/7242* (2013.01); *B32B 2307/7244* (2013.01); *B32B 2439/00* (2013.01); *B32B 2439/70* (2013.01); *B32B 2439/80* (2013.01); *D21H 15/02* (2013.01); *Y10T 428/1303* (2015.01); *Y10T 428/249962* (2015.04); *Y10T 428/26* (2015.01)

(58) Field of Classification Search
CPC ....... Y10T 428/26; B32B 29/06; B32B 27/10; D21H 19/34; D21H 19/52; D21H 27/30; D21H 27/10; C09D 101/02
USPC ....... 162/130, 149; 442/340; 428/34.2, 34.3, 428/537.5, 534, 535; 427/382

See application file for complete search history.

(56) References Cited

U.S. PATENT DOCUMENTS

| | | | |
|---|---|---|---|
| 2004/0023045 A1* | 2/2004 | Andersson | B32B 7/12 428/461 |
| 2005/0067730 A1 | 3/2005 | Yano et al. | |
| 2007/0022901 A1* | 2/2007 | Kurze | C09D 11/101 106/31.6 |
| 2007/0207692 A1* | 9/2007 | Ono | B01D 39/18 442/327 |
| 2009/0324143 A1* | 12/2009 | Sharp | B65D 31/02 383/109 |
| 2010/0316863 A1* | 12/2010 | Kumamoto | C08J 7/047 428/292.1 |
| 2011/0008638 A1* | 1/2011 | Miyawaki | C08B 15/02 428/537.5 |

FOREIGN PATENT DOCUMENTS

| | | | |
|---|---|---|---|
| EP | 2371893 A1 | 10/2011 | |
| JP | 11-309816 | 11/1999 | |
| JP | 2002-322313 | 11/2002 | |
| JP | 2002322313 A * | 11/2002 | |
| JP | 2002-348522 | 12/2002 | |
| JP | 2003-201695 | 7/2003 | |
| JP | 2007231438 A * | 9/2007 | |
| JP | 2009-57552 | 3/2009 | |
| JP | 2009-263848 | 11/2009 | |
| JP | 2009-263850 | 11/2009 | |
| JP | 2009-263854 | 11/2009 | |
| KR | 10-2006-0129300 | 12/2006 | |
| WO | WO 2004/016852 A2 | 2/2004 | |
| WO | WO 2009122982 A1 * | 10/2009 | C08B 15/02 |

OTHER PUBLICATIONS

Chinese Office Action dated Jan. 6, 2014 in corresponding Chinese Application No. 201180015232.9.
Korean Office Action dated Jun. 23, 2017 in corresponding Korean Patent Application No. 10-2012-7026348.
International Search Report of PCT/JP2011/056542 dated Jun. 21, 2011.
Extended European Search Report dated Aug. 19, 2013 in corresponding European Application No. 11759327.7.

* cited by examiner

LAMINATED BODY, METHOD FOR PRODUCING THE SAME, AND MOLDED CONTAINER

CROSS-REFERENCE TO RELATED APPLICATIONS

This application is a U.S. National Stage application of PCT/JP2011/056542 filed Mar. 18, 2011 and claims the foreign priority benefit of Japanese Application No. 2010-068750 filed Mar. 24, 2010 in the Japanese Intellectual Property Office, the contents of both of which are incorporated herein by reference.

TECHNICAL FIELD

The present invention relates to a laminated body, a method for producing the same, and a molded container, which provide barrier properties against various targets, such as gas, odor, liquid, and drugs; keep the contents from deteriorating and spoiling due to these, or prevent the contents from leaking out to the outside; and are suitable for packaging food, toiletry products, drugs, electronic members, and electronic devices.

BACKGROUND ART

In order to keep food, drugs, electronic members, and electronic devices from deteriorating and spoiling due to oxygen, water vapor, or the like, gas barrier materials, such as a gas barrier film that suppresses the permeability to oxygen or water vapor, are used for packaging the above.

In the related art, as examples of barrier materials, a copolymer of polyvinyl alcohol (PVA) and ethylene vinyl alcohol, resin films, such as polyvinylidene chloride resin, films on which these resins are coated, ceramic vapor deposition films, and the like are used, and laminated bodies in which the gas barrier material is laminated on various bases are being studied.

Additionally, many molded containers made of plastics or the like are used as barrier containers. However, plastics are mostly limited resources originating from petroleum and have high combustion heat, and environmental problems or the like. With recent environmental preservation type thinking or enforcement of the Container and Packaging Recycling Law, converting from plastic materials to renewable materials originating from natural resources, such as paper, is needed.

In addition, the study of providing various barrier layers on paper and utilizing the resulting products as packaging materials has been performed. For example, a technique of bonding a paper base to a film having barrier properties or a film having a barrier layer, a technique (for example, refer to PTL 1) of providing a resin composite layer having an inorganic layered compound or a thermoplastic resin layer on a paper base, or a technique of providing a resin layer on a paper base or a paper container and laminating an inorganic thin film layer through vapor deposition, CVD, or the like to thereby give barrier properties has been studied.

However, countless irregularities are present in the surface of the paper base in the order of millimeters or nanometers. Therefore, in the technique of laminating an inorganic thin film layer on a paper base to thereby give barrier properties, in a case where an inorganic thin film layer having a glassy property and an extremely brittle property is formed as a film, problems have been pointed out that defects resulting from being formed on irregularities of the surface of the paper base are generated within the barrier layer, and barrier properties are degraded.

Additionally, when various barrier layers are provided on paper to give barrier properties, it is considered that the density, air permeability, or smoothness of the paper base is controlled to give higher barrier properties. For example, a technique of using paper with a high density or filling resin between paper fibers has been studied.

However, these techniques are techniques that cannot give sufficient barrier properties or that perform contact or bonding only and have little interaction with the paper fibers. Additionally, even in the technique of performing filling through coating, impregnation, or the like, a layer that follows irregularities in the order of millimeters or nanometers on the paper surface, may be formed, and a sufficient function cannot be exhibited. Therefore, a layer having a considerable thickness had to be formed to remove influence of the irregularities of the paper, and was a mere filling and plugging material.

Additionally, since many of such fillers use synthetic polymers originating from petroleum, the fillers cannot sufficiently utilize the advantages of renewable materials originating from natural products that a paper material intrinsically has. In addition, although some fillers made of materials originating from natural products and obtained through coating or the like of polymers or fibers having barrier properties, have also been reported, in a mere polymer in which molecules are dispersed, the layer that follows the irregularities on the surface of the paper will be formed due to the form and softness of the polymer. Additionally, a film that has functions in the form of a thin film is not obtained, and even if the layer having considerable thickness is formed, those in which both the aforementioned barrier and filling functions and environmental friendliness are sufficiently achieved are not obtained.

CITATION LIST

Patent Literature

[PTL 1] Japanese Unexamined Patent Application, First Publication No. 11-309816

SUMMARY OF INVENTION

Technical Problem

Thus, the invention has been made in consideration of the above background art, and an object thereof is to provide a material that effectively utilizes natural resources and is friendly to the environment as a whole, and to provide a laminated body that can be a barrier material that has excellent strength and excellent affinity and adhesion to a paper base due to an interaction with paper fibers and that gives sufficient barrier properties even in the form of a thin film, a method for producing the same, and a molded container.

Solution to Problem

In order to solve the above problems, a first invention of the inventions is a laminated body having a plurality of layers laminated thereon. The laminated body includes a base made of paper, and a fiber layer laminated on at least one surface of the base and containing fine cellulose fibers each having a fiber diameter of 1 nm or more and 10 μm or less.

Here, the laminated body related to the invention can be a barrier material that is equivalent to or superior to the related art by having less material and fewer processes, if a material that is small in the thickness of the overall barrier material is more environmentally friendly is used or if a layer made of metal or metal oxide is formed on a base made of paper in order to obtain a paper material having higher barrier properties.

That is, a second invention of the inventions is that the fiber layer contains fine cellulose fibers each having a fiber diameter of 1 nm or more and 30 nm or less.

Additionally, a third invention of the inventions is the laminated body related to the second invention, in which the fiber layer contains the fine cellulose fibers each having a fiber diameter of 1 nm or more and 30 nm or less in an amount of 10 mass % or more and 99 mass % or less, and contains fine cellulose fibers each having a fiber diameter of 100 nm or more and 10 μm or less in an amount of 1 mass % or more and 90 mass % or less.

Additionally, a fourth invention is the laminated body related to the third invention, in which the fine cellulose fibers have a crystallinity of 70% or more and 100% or less.

Additionally, a fifth invention is the laminated body related to the fourth invention, in which the fine cellulose fibers have 0.1 mmol/g or more and 3.5 mmol/g or less of a carboxyl group with respect to cellulose mass.

Additionally, a sixth invention is the laminated body related to the fifth invention, in which the bending elastic modulus of the fiber layer is 2 GPa or more and 30 GPa or less.

Additionally, a seventh invention is the laminated body related to the sixth invention, in which the arithmetic mean roughness (Ra) of the surface of the fiber layer is 100 nm or more and 2000 nm or less.

Additionally, an eighth invention is the laminated body related to the seventh invention, in which the thickness of the fiber layer is 100 nm or more and 2000 nm or less.

Additionally, a ninth invention is the laminated body related to the eighth invention, in which oxygen permeability at a temperature of 30° C. and at a humidity of 70% is within a range of 0.001 cm³/m²·atm·day or more and 10 cm³/m²·atm·day or less.

Additionally, a tenth invention is the laminated body related to the eighth invention, in which water vapor permeability at a temperature of 40° C. and at a humidity of 90% is within a range of 0.0000001 g/m²/day or more and 50 g/m²/day or less.

Additionally, an eleventh invention is the laminated body related to the eighth invention, in which the oil resistance evaluated according to the JAPAN TAPPI paper pulp test method No. 41 has a kit number of 10 or more.

Additionally, a twelfth invention is the laminated body related to the second invention, in which the fiber layer further contains an inorganic layered mineral.

Additionally, a thirteenth invention is the laminated body related to the second invention, in which the fiber layer further contains a composite material with a silica compound, shown in the following General Formula (1), or its hydrolyzate. Here, in the following General Formula (1), X1, X2, X3, and X4 are the same or are different from each other, and are any one of a hydroxyl group, an alkoxy group, and an alkyl group.

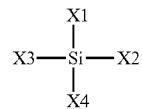
[Chem. 1]

Additionally, a fourteenth invention is the laminated body related to the second invention, in which the thickness of a mixed layer of the base and the fiber layer is 10 nm or more and 2000 nm or less.

Additionally, a fifteenth invention is the laminated body related to the second invention, in which the fiber layer and a thin film layer made of metal or metal oxide are provided on at least one surface of the base.

Additionally, a sixteenth invention is the laminated body related to the second invention, in which a laminated body including a resin layer or a sealant layer is further provided on at least one surface of the laminated body related to the fifth invention.

The laminated bodies related to the invention mentioned above keep contents from deteriorating or spoiling or prevent start of leakage outside, and are suitable for packaging food, toiletry products, drugs, electronic members, and electronic devices. That is, a seventeenth invention among the inventions is a molded container using the laminated body related to the second invention.

Additionally, an eighteenth invention among the inventions is a method for producing a laminated body including coating a coating liquid containing fine cellulose fibers each having a fiber diameter of 1 nm or more and 10 μm or less on at least one surface of a base made of paper, to form a coating film; and drying the coating film to form a laminated body.

Additionally, a nineteenth invention is the method for producing the laminated body related to the eighteenth invention, in which the coating liquid has a solid content concentration of 1% and a transmissivity of 0.1% or more and 70% or less.

Advantageous Effects of Invention

As described above, since the laminated body related to the invention is provided by forming the layer containing the fine cellulose fibers on the base made of paper, it is possible to provide a material that effectively utilizes natural resources and is friendly to the environment as whole.

Also, this laminated body includes the fiber layer containing the fine cellulose fibers each having a fiber diameter of 1 nm or more and 10 μm or less on at least one surface of the base made of paper. Thus, if the diameter of the fine cellulose fibers is specified to be within this range, the laminated body can be a barrier material that has excellent strength and excellent affinity and adhesion to the paper base due to an interaction with the paper fibers and that can give sufficient barrier properties against gas, an odor, a liquid, and drugs, even in the form of a thin film. Hence, according to a molded container using this laminated body, the above problems can be solved similarly.

Moreover, as described above, if the laminated body related to the invention is configured to have a layer made of metal or metal oxide, a laminated body having excellent higher barrier properties can be obtained. Additionally, if a configuration including ultrafine fibers in the layer containing the fine cellulose fibers is provided, defects of the layer made of metal or metal oxide can be prevented.

Additionally, if a configuration including fibers or particles that have a certain range of diameter even among the fine fibers in the layer containing the fine cellulose fibers is provided, the surface of the base can be efficiently reformed and an excellent laminated body can be obtained.

DESCRIPTION OF EMBODIMENTS

The invention will be described below in detail on the basis of embodiments.

Figure 1:
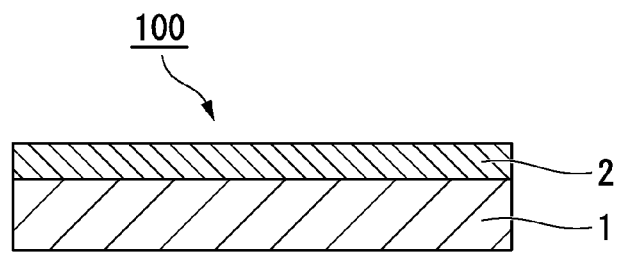
FIG. 1 is a cross-sectional view of a first embodiment of a laminated body related to the invention.

A laminated body 100 of a first embodiment shown in FIG. 1 has at least a base 1 made of paper and a fiber layer 2 attached to one surface of the base 1.

As the a base 1, high-quality paper, various kinds of coated paper, backing paper, impregnated paper, cardboard and paperboard, those obtained by bonding these kinds of paper and a resin film layer, a metal layer, or the like into a box, a pulp mold molded in the form of a box, and the like can be used, and the base is not limited to these.

The fiber layer 2 contains fine cellulose fibers, and the mean diameter of the fine cellulose fibers is within a range of 1 nm or more and 200 nm or less. As measurement of the diameter of these fibers, a technique of performing shape observation using an apparatus, such as AFM or SEM, measuring the fiber widths of a large number of arbitrary samples, and obtaining the mean values thereof, or performing measurement from particle diameter test results using the particle size dispersion meter or the like for a coating liquid is possible. In addition, measurement values from the observation of the former were used in the invention.

Here, if the mean diameter of the fine cellulose fibers is within a range of 1 nm or more and 200 nm or less, the smoothness of the surface of a coated or cast film improves at a nanometer level, and a great effect is exerted on smoothing of the paper base. Additionally, since entanglement of the fibers or an area of hydrogen bonding becomes huge, favorable barrier properties and the interaction with the fibers in the paper base also increases, and adhesion also improves. Additionally, the entanglement of these fibers can maintain the flexibility of a film made of fibers having a high elastic modulus and a high strength to be described below.

In particular, the fiber layer 2 contains fine cellulose fibers each having a fiber diameter of 1 nm or more and 30 nm or less in an amount of 10 mass % or more. If the fine cellulose fibers are contained within this range, the effect of improving the smoothness of the film surface is large, and when a metal layer or an oxidized metal layer are further provided, a layer without holes or defects can be more densely formed and high barrier properties can be given.

Moreover, by controlling the size of these fine cellulose fibers, fine fibers with a large diameter can efficiently smooth large irregularities of the paper base, and fine fibers with a small diameter can further improve the smoothness at a nanometer level. Additionally, a dense film that is efficiently filled into pores of paper can be formed by controlling the diameter and compounding ratio of these fine fibers.

Specifically, the fine cellulose fibers each having a small fiber diameter of 1 nm or more and 30 nm or less are preferably contained in an amount of 10 mass % or more and 99 mass % or less, and fine cellulose fibers each having a large fiber diameter of 100 nm or more and 10 µm or less are preferably contained in an amount of 1 mass % or more and 90 mass % or less. If the fine cellulose diameter is within this range, a dense film that is efficiently filled into pores of paper can be formed.

In particular, in a case where the fine cellulose fibers each having a small fiber diameter of 1 nm or more and 30 nm or less are contained in an amount of 25 mass % or more and 90 mass % or less, and the fine cellulose fibers each having a large fiber diameter of 100 nm or more and 10 µm or less are contained in an amount of 10 mass % or more and 75 mass % or less, smoothing of paper can be more efficiently achieved. Thus, the thickness of a film can be reduced, transmissivity can be made low to suppress offset, or interference fringes of a coating film can be suppressed.

In particular, it is preferable to contain the fine cellulose fibers each having a fiber diameter of 1 nm or more and 10 µm or less. If the fine cellulose fibers contained are within this range, large irregularities of the paper base can be efficiently smoothened, and a dense film can be formed on the surface of the base, and various barrier properties are excellent. Additionally, even when a metal layer or a metal oxide layer is provided, the effect of preventing defects is efficiently exhibited.

In addition, in the fine cellulose fibers with a large fiber diameter, the shape of the cellulose may not be fine fiber-like. For example, even if the shape of the cellulose has a particle form, the above effects can be obtained. In a case where the shape of the cellulose has a particle form, cellulose particles having a particle diameter of 100 nm or more and 10 µm or less are contained in an amount of 1 mass % or more and 90 mass % or less similarly to a case where the shape of the cellulose is fine fiber-like. Thereby, the large irregularities of the paper base can be efficiently smoothened.

Additionally, the bending elastic modulus of the fiber layer 2 containing the fine cellulose fibers is 2 GPa or more and 30 GPa or less.

If the bending elastic modulus is within this range, the surface of the base can be efficiently reformed. For example, through the coating of a thin film on the paper base with remarkable irregularities, smoothing of the base surface can be efficiently achieved and high barrier properties can be given. Additionally, when a metal layer or an oxidized metal layer is further given to the layer containing the fine cellulose fibers, not only can a layer without holes or defects be more densely formed and high barrier properties be provided, but also high strength can be given to the overall laminated body. Therefore, the physical strength when being used as a packaging material or various materials can be given. If the bending elastic modulus is 2 GPa or more and 12 GPa or less, this is more preferable. If the bending elastic modulus is 2 GPa or more and 12 GPa or less, strength can be given even in a thin film, and the paper base can also be made thin. Therefore, favorable effects are given even in terms of cost or environment. Additionally, even when a thick layer is provided, post-processing is not affected without the layer being too hard. In particular, if the bending elastic modulus is within a range of 3 GPa or more and 6 GPa or less, this is more preferable because strength is also high and handling is easy.

Moreover, the fine cellulose fibers contained in the fiber layer 2 among a plurality of layers of the above laminated body 100 have a crystallinity of 70% or more and 100% or less. If the crystallinity is within this range, not only high strength can be given, but also adsorption of various gases, drugs, liquids, or the like is suppressed within crystals, and high barrier properties can be given.

Additionally, it is possible to provide a barrier material made of a composite material that utilizes the interaction between the paper base 1, and the fine cellulose fibers contained in the fiber layer 2, and that also has high affinity and adhesion. Additionally, a dense film with that can be efficiently filled into pores of paper can be formed by the fine fibers with a large diameter and the fine fibers with a small diameter being contained. Moreover, a material that has sufficient strength and barrier properties even in the form of a thin film can be provided by providing hard structure and soft structure.

Additionally, in the fine cellulose fibers contained in the above fiber layer 2, the amount of a carboxyl group with respect to cellulose mass is within a range of 0.1 mmol/g or more and 3.5 mmol/g or less. The amount of the carboxyl group can be measured by a conductometric titration method for the cellulose fibers.

When the amount of the carboxyl group is within a range of 0.1 mmol/g or more and 3.5 mmol/g or less, a laminated body with favorable oxygen barrier properties that is an important factor, particularly as the performance of a packaging material, is obtained. If the amount of the carboxyl group is less than 0.1 mmol/g, oxygen barrier properties cannot be sufficiently exhibited, and if the amount is more than or equal to 3.5 mmol/g, oxygen barrier properties under high humidity or water resistance will become low.

As a method for measuring the amount of the carboxyl group, 0.2 g of reformed cellulose in terms of dried mass is placed in a beaker, and 80 ml of ion exchanged water is added. 5 ml of a 0.01 M sodium chloride water solution is added to the resulting product, and 0.1 M hydrochloric acid is added while performing agitation, and adjustment is made so as to become pH 2.8 as a whole. Here, the 0.1 M aqueous sodium hydroxide solution is poured at 0.05 ml/30 seconds, using an automatic titrator (AUT-701 manufactured by DKK-Toa Corporation), conductivity and pH value are measured every 30 seconds, and the measurement is continued to pH 11. The titration amount of sodium hydroxide is calculated from the obtained conductivity curve, and the content of the carboxyl group is calculated.

Additionally, an inorganic layered mineral may also be contained in the fiber layer 2 contained in the laminated body 100. As the layered mineral, a kaolinite group, a smectite group, a mica group, or the like can be used, and montmorillonite, hectorite, saponite, or the like can be mentioned. Among them, montmorillonite is particularly preferable from high aspect ratio and area, the stability of a coating liquid, and good coating performance. The inorganic layered mineral is preferably contained in an amount of 0 mass % or more and 70 mass % or less in the fiber layer 2. If the inorganic layered mineral is contained within this range, the smoothness of the surface of a film can be further improved by the inorganic layered mineral without reducing the affinity and adhesion between the cellulose fibers and the paper base, and a great effect can be exerted on smoothing of the paper base. Moreover, a thin film of metal or oxidized metal can be more uniformly laminated, and adhesion between the paper base or the cellulose fiber layer and the thin film of metal or oxidized metal can be enhanced. Additionally, swelling of the cellulose can be suppressed by the inorganic layered mineral, and barrier properties against gas, moisture, oil, an odor, or the like can be enhanced. Moreover, if the inorganic layered mineral is contained in an amount of 10 mass % or more and 50 mass % or less, the strength of the film can be kept from decreasing by putting in the layered mineral. Additionally, if the inorganic layered mineral is contained in an amount of 30 mass % or more and 50 mass % or less, higher barrier properties can be exhibited in addition to the above effects.

Moreover, a composite material with a silica compound, shown in the following General Formula (2), or its hydrolyzate may be contained in the fiber layer 2 containing the fine cellulose fibers. In the following General Formula (2), X1, X2, X3, and X4 are the same or are different from each other, and represent any one of a hydroxyl group, an alkoxy group, and an alkyl group. The silica compound or its hydrolyzate is preferably contained in an amount of 0 mass % or more and 70 mass % or less in the fiber layer 2. If the silica compound or its hydrolyzate is contained within this range, adhesion to the base, water resistance or swelling of the cellulose can be suppressed without impairing the flexibility of the membrane. Moreover, the silica compound or its hydrolyzate have effects even in uniformly laminating a thin film of metal or oxidized metal or enhancing adhesion to the paper base or the cellulose fiber layer and the thin film of metal or oxidized metal. In particular, the defects of metal or oxidized metal can be made up for, high barrier properties can be given, and, a barrier against small molecules, such as gas, in addition to water, drugs, an odor, or the like can also be formed. Moreover, if the silica compound or its hydrolyzate is contained in an amount of 30 mass % or more and 60 mass % or less, the barrier properties can be exhibited at a high level.

[Chem. 2]

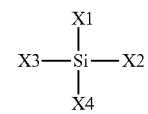

By containing a composite material with a silica compound or its hydrolyzate, not only water resistance against water and oxygen or water vapor barrier properties under high humidity improve, but also, when the vapor deposition layer 3 made of metal or oxidized metal is provided like the laminated body 300 or 400 shown in FIG. 3 or 4 to be described below, the adhesion between the layers or degradation of a vapor deposition film can be prevented.

Additives may be further contained in the fiber layer 2 containing the fine cellulose fibers in order to give functionality, in addition to the above inorganic layered mineral and silica compound or its hydrolyzate. The additives include, for example, a leveling agent, an antifoaming agent, synthetic polymer, inorganic particles, organic particles, a lubricant, an ultraviolet absorber, a dye, a pigment, a stabilizer, or the like. These can be contained within a range not impairing barrier properties.

Additionally, the arithmetic mean roughness (Ra) of the surface of the fiber layer 2 of the laminated body of the invention is 100 nm or more and 2000 nm or less. If the arithmetic mean roughness (Ra) of the surface of the fiber layer 2 is within this range, smoothness is high. Therefore, not only favorable characteristics are exhibited in a case where subsequent printing, coating, or the like is performed, but also, when the vapor deposition layer 3 made of metal or oxidized metal is given like the laminated body 300 or 400 to be described below, it is possible to prevent degradation of barrier properties resulting from presence of defects, such as cracks, a pinholes, or the like.

Additionally, the thickness of the fiber layer 2 of the laminated body of the invention is preferably 100 nm or more and 2000 nm or less. By setting the thickness of the fiber layer 2 to a range of 100 nm or more and 2000 nm or less, an excellent effect is exhibited even in terms of costs because sufficient barrier properties are exhibited even if the film thickness is small. In addition, even if the thickness of the fiber layer has a larger value than the above range, strength improves, and barrier properties also do not degrade. However, problems may occur in that the range is not preferable in terms of costs, and the layer is too hard and cracks are generated when a laminated body is worked. Additionally, if the thickness of the fiber layer is a smaller value than the above range, pinholes or the like may be formed, and the fibers on the surface of the paper base cannot be sufficiently coated. As a result, barrier properties against gas, moisture, oil, or the like may be unable to be exhibited.

Additionally, the laminated body of the invention can improve the smoothness and barrier properties of the base 1 by coating the aforementioned liquid containing the cellulose fine fibers on the paper base 1 and drying this liquid. This enables the base 1 to be reformed by the relatively simple technique including coating and drying.

Well-known methods can be used as the technique of coating the liquid containing the fine cellulose fibers. Specifically, they are a photogravure coater, a dip coater, a reverse coater, a wire bar coater, a die coater, and the like. By using a wet film forming method, a coating film with a surface shape that does not follow irregularities of the paper base 1 can be formed. Additionally, although a solvent for the coating liquid is also not particularly limited, one kind or a plurality kinds of various organic solvents including water and alcohol can be used.

Next, a laminated body of a second embodiment of the invention will be described.

Figure 2:
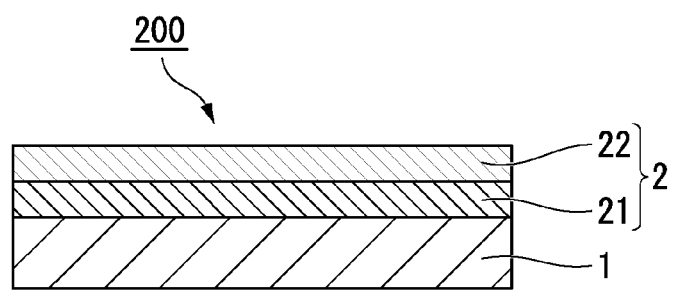
FIG. 2 is a cross-sectional view of a second embodiment of the laminated body related to the invention.

As shown in FIG. 2, in a laminated body 200 of the second embodiment, a liquid containing the aforementioned fine cellulose fibers is coated on the base 1 made of paper, and this liquid is dried, thereby forming a fiber layer 2 including a mixed layer 21 that contains the base component of the base 1 and the fine cellulose fibers, and a layer 22 that does not contain the base component but contains the fine cellulose fibers.

According to such a configuration, a coating liquid that can form a film with a high elastic modulus, which contains fibers having a certain degree of size like cellulose nanofibers, is coated on the base 1. Thereby, not only can the coating liquid infiltrate into a mesh structure of the fibers of the base 1 that has marked irregularities and is porous, thereby forming the mixed layer 21 that is a layer containing the base component and the fine cellulose fibers, but also the layer 22 that does not contain the base component on the surface thereof but contains the fine cellulose fibers can be formed on the paper base.

At this time, the thickness of the mixed layer 21 is preferably within a range of 10 nm or more and 2000 nm or less. If the thickness of the mixed layer 21 is within the above range, according to the above principle, not only does the liquid completely permeate into the meshes of the paper, but also a continuous film can be formed on the surface of the paper base 1, and a smooth surface rather than a coating film that follows irregularities can be efficiently formed. Therefore, a laminated body that is excellent even in various barrier properties against gas, an odor, a liquid, drugs, and a solid matter can be obtained.

Figure 3:
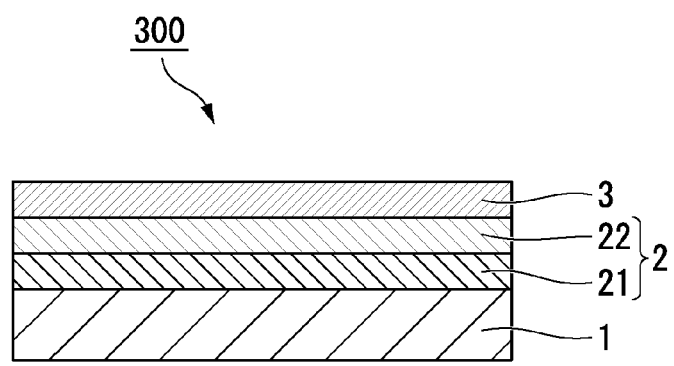
FIG. 3 is a cross-sectional view of a third embodiment of the laminated body related to the invention.

In particular, in a case where a vapor deposition layer 3 is formed on the fiber layer 2 as shown in FIG. 3 to be described, the vapor deposition layer 3 is easily cracked, and is desired to exhibit sufficient functions in the form of a thin film. In contrast to this point, since the surface of the laminated body 200 is smooth, it is possible to suppress the unevenness or defects of the vapor deposition layer 3 by the irregularities of the base 1. Additionally, by providing the mixed layer 21 of which the thickness is within a range of 10 nm or more and 2000 nm or less, the affinity and adhesion of the fiber layer 2 to the base 1 can be enhanced.

In the aforementioned coating liquid in a case where coating is made on the paper base 1, the transmissivity when being diluted at a solid content concentration of 1% is preferably within a range of 0.1% or more and 70% or less. If the transparency of the liquid is within this range, the opacity of the base 1 after coating can be raised, the effect of preventing back projection is also large, and reflection or interference fringes can be suppressed while raising the gloss of a coating surface.

As a method for measuring the transmissivity, a liquid containing various cellulose fine fibers is diluted with water or a coating liquid solvent so as to have a solid content concentration of 1%. This liquid is put into a 1 cm-square quartz glass cell, a transmissivity at a wavelength of 660 nm measured by the spectrophotometer or the liked is read and adopted as the transmissivity. Arbitrary types of devices may be used if the transmissivity at a wavelength of 660 nm can be measured.

Next, laminated bodies of third and fourth embodiments of the invention will be described.

Figure 4:
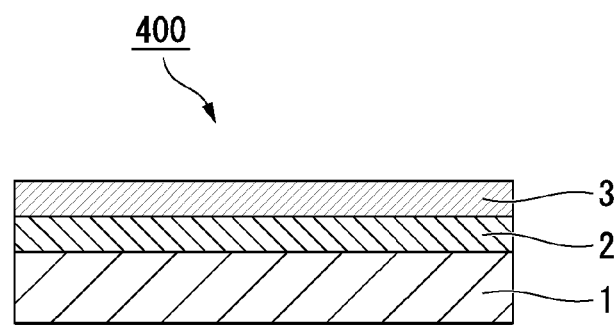
FIG. 4 is a cross-sectional view of a fourth embodiment of the laminated body related to the invention.

A laminated body 300 of a third embodiment is shown in FIG. 3, and a laminated body 400 of a fourth embodiment is shown in FIG. 4. The laminated bodies 300 and 400 are different from the above laminated body 100 or laminated body 200 in that the vapor deposition layer 3 is further provided on the fiber layer 2.

The vapor deposition layer 3 is made of metal or oxidized metal, and various metals or oxidized metals can be laminated by vapor deposition coating, dipping, lamination, or the like. Although the kind of metal or oxidized metal is not particularly limited, aluminum, aluminum oxide, silicon dioxide, or the like is preferable when being utilized as the laminated body related to the invention or a barrier material or the like using this.

In particular, in a case where a layer of aluminum, aluminum oxide, silica, or the like is used as the vapor deposition layer 3, the layer can be molded by plasma or a vapor deposition process, such as vacuum vapor deposition, and thin films resulting from these can give functions, such as barrier properties, with high efficiency and excellent productivity. Additionally, it is difficult to form a film through the above process, such that a uniform and continuous thin film can be formed, for the reasons such that the base 1 of paper or like has marked irregularities originally, and gas, such as moisture contained inside the paper base, escapes. However, by including the fiber layer 2 in the above-described invention to giving smoothness and gas barrier properties, the surface of the base can be efficiently reformed, and these problems can be solved.

In addition, by performing plasma treatment or the like as a previous process that forms the vapor deposition layer 3, moisture, dust, or the like on the surface of the surface of a functional layer can be removed, and smoothing and activation of the surface of the functional layer may be promoted.

In addition, the invention is not limited to the above-described embodiments, and alternations, such as design changes, can also be made on the basis of the knowledge of a person's skilled in the art. Embodiments in which such alternations are made shall be included within the scope of the invention.

Figure 5:
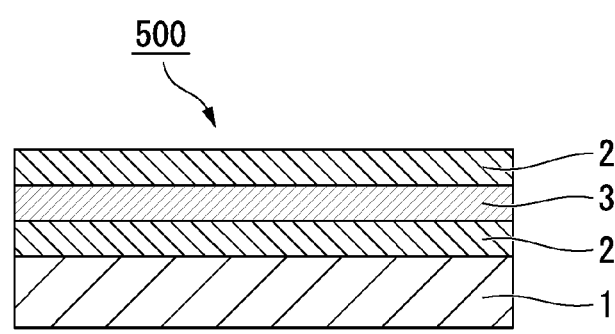
FIG. 5 is a cross-sectional view of a fifth embodiment of the laminated body related to the invention.

For example, the laminated body of the invention can be provided by further laminating the fiber layer 2 on the configuration of the third or fourth embodiment, like a laminated body 500 of a fifth embodiment shown in FIG. 5, if needed.

Figure 6:
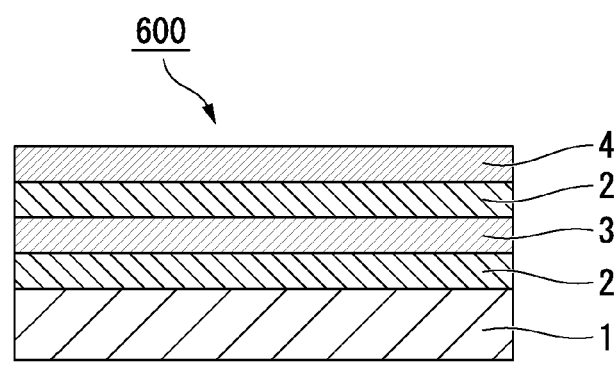
FIG. 6 is a cross-sectional view of a sixth embodiment of the laminated body related to the invention.

Moreover, the laminated body of the invention can be provided by laminating further laminating a resin layer or a sealant layer 4 like a laminated body 600 of a sixth embodiment shown in FIG. 6 or can be provided by laminating an anchor primer layer, an antifouling layer, a printing layer, an antistatic layer, or the like for improving the strength between respective layers. In this case, the respective layers to be laminated may be laminated by melting and extrusion, may be laminated using an adhesive, may be laminated by vapor deposition or the like.

In particular, for example, antifouling and barrier against a liquid with high permeability can be given to the resin layer, and the sealant layer can retain a shape and prevent leakage of contents during molding or the like. Materials for the respective layers are not particularly limited, and well-known materials, such polyolefin, epoxy, urethane, isocyanate, polyester, and vegetable-originating materials (bio-plastics), can be used.

In addition, the laminated body related to the invention mentioned above can be used for various films or sheets, and can also be used for various molded containers having a bottle shape, a tubular shape, a box shape, or the like.

Details of the invention will be described below using examples.

Production Example 1

30 g of softwood kraft pulp were dipped in 600 g of water, and was dispersed by a mixer. 0.3 g of TEMPO that was dissolved in advance in 200 g of water was added to pulp slurry after the dispersion, 3 g of NaBr was added and was further diluted with water, and the whole was made up to 1400 mL. The inside of a system was kept at 20° C., and an aqueous sodium hypochlorite water solution was measured and was added dropwise so as to become 10 mmol with respect to 1 g of cellulose.

Although pH began to fall from the start of the dropwise addition, pH was kept at 10 using a 0.5 N aqueous sodium hydroxide solution. After two hours, 30 g of ethanol was added when 0.5 N sodium hydroxide became 2.5 mmol/g, and the reaction was stopped. 0.5 N hydrochloric acid was added to the reaction system, and was made to fall to pH 2. When conductivity titration was performed using 0.1 N sodium hydroxide using the automatic titrator (AUT-701 manufactured by DKK-Toa Corporation) in which oxidized pulp was obtained after oxidized pulp was filtered and repeatedly washed with 0.01 N hydrochloric acid or water, the amount of the carboxyl group was calculated to be 1.3 mmol/g. The obtained oxidized pulp was diluted with water and a 1% dispersion liquid of pH 8 was obtained using the aqueous sodium hydroxide solution. The dispersion liquid was agitated by a high-speed agitator during two days as it is, and a dispersion liquid containing fine cellulose fibers was obtained.

Production Example 2

30 g of softwood kraft pulp was dipped in 600 g of water, and was dispersed by a mixer. 0.3 g of TEMPO that was dissolved in advance in 200 g of water was added to pulp slurry after the dispersion, 3 g of NaBr was added and was further diluted with water, and the whole was made up to 1400 mL. The inside of a system was kept at 20° C., and a sodium hypochlorite water solution was measured and was added dropwise so as to become 10 mmol with respect to 1 g of cellulose.

Although pH began to fall from the start of the dropwise addition, pH was kept at 10 using a 0.5 N aqueous sodium hydroxide solution. After three hours, 30 g of ethanol was added when 0.5 N sodium hydroxide became 2.8 mmol/g, and the reaction was stopped. 0.5 N hydrochloric acid was added to the reaction system, and was made to fall to pH 2. After oxidized pulp was filtered and repeatedly washed with 0.01 N hydrochloric acid or water, oxidized pulp was obtained. Then, when conductivity titration was performed using 0.1 N sodium hydroxide using the automatic titrator (AUT-701 manufactured by DKK-Toa Corporation), the amount of the carboxyl group was calculated to be 1.6 mmol/g. The obtained oxidized pulp was diluted with water and a 1% dispersion liquid of pH 9 was obtained using the aqueous sodium hydroxide solution. The dispersion liquid was processed for 5 minutes by an ultrasonic homogenizer, and an aqueous solution containing 1% of fine cellulose fibers was obtained.

Production Example 3

30 g of softwood kraft pulp was dipped in 600 g of water, and was dispersed by a mixer. 0.3 g of TEMPO that was dissolved in advance in 200 g of water was added to pulp slurry after the dispersion, 3 g of NaBr was added and was further diluted with water, and the whole was made up to 1400 mL. The inside of a system was kept at 20° C., and a sodium hypochlorite water solution was measured and was added dropwise so as to become 10 mmol with respect to 1 g of cellulose.

Although pH began to fall from the start of the dropwise addition, pH was kept at 10 using a 0.5 N aqueous sodium hydroxide solution. After 4 hours, 30 g of ethanol was added and the reaction was stopped. 0.5 N hydrochloric acid was added to the reaction system, and was made to fall to pH 2. After oxidized pulp was filtered and repeatedly washed with 0.01 N hydrochloric acid or water, oxidized pulp was obtained. Then, when conductivity titration was performed using 0.1 N sodium hydroxide using the automatic titrator (AUT-701 manufactured by DKK-Toa Corporation), the amount of the carboxyl group was calculated to be 2.4 mmol/g. The obtained oxidized pulp was diluted with water and a 1% dispersion liquid of pH 6 was obtained using the aqueous sodium hydroxide solution. The dispersion liquid was processed for 5 minutes by an ultrasonic homogenizer, and an aqueous solution containing 1% of fine cellulose fibers was obtained.

Production Example 4

Montmorillonite with a 4% solid content that was dispersed in water was mixed with the aqueous solution containing 1% of fine cellulose fibers of the above Production Example 2 so that the mass ratio of cellulose and montmorillonite was 1:1. Further, dispersion was performed for 1 minute by the ultrasonic homogenizer.

Production Examples 5, 6, 7, and 8

The water solutions containing fine cellulose fibers of Production Examples 1 and 2 were mixed so that the mass ratios were 1:9, 5:5, 7.5:2.5, and 9.5:0.5, respectively, and aqueous solutions of Production Examples 5, 6, 7, and 8 were obtained.

[Evaluation 1 of Production Examples]

1% aqueous solutions were used as the respective dispersion liquids and put into 1 cm-square quartz glass, and the transmissivity at 660 nm was measured by a spectrophotometer.

[Evaluation 2 of Production Examples]

The respective dispersion liquids were diluted to the concentration 0.01%, were coated on mica, and the form of fibers was observed by AFM. The mean value of the height of ten arbitrary fibers that were present was obtained one by one, or SEM observation was performed after being coated with platinum, and the mean value of the widths of the ten fibers was found and adopted as a mean fiber diameter.

[Evaluation 3 of Production Examples]

The dispersion liquid of each of Production Examples 1 to 7 was cast on a glass base, and was dried at 80° C. for one night to obtain a sheet with a thickness of 2 mm. This sheet was clipped in the shape of a strip with a width of 25 mm and a length of 40 mm, three-point bending of the sheet was performed according to JIS-K7171, and the bending elastic modulus in 10 mm/min was obtained.

The results of Evaluations 1 to 3 of Production Examples are shown in Table 1.

Examples 8 to 14

The respective dispersion liquids of Production Examples 1 to 7 were coated on the surfaces of coated paper with a basis weight of 75 g/m$^2$ by a bar coater so as to have a film thickness of 200 nm, and were dried in an oven of 120° C. for 3 minutes to make laminated bodies of Examples 8 to 14.

Examples 15 to 21

A silicon oxide film of 50 nm was further laminated on the coating surface of each of the laminated bodies of Examples 1 to 7 by vacuum vapor deposition, to obtain laminated bodies of Examples 15 to 21.

Examples 22 to 24

A polyethylene film with a thickness of 70 μm was further laminated on the coating surface or vapor deposition surface of each of the laminated bodies of Examples 3, 4, and 18, using an urethane adhesive, to obtain laminated bodies of Examples 22 to 24.

Example 25

An aqueous solution, in which tetraethoxysilane was added in a concentration of 1% to a mixed solution, which was obtained by mixing methanol with a 0.02 N hydrochloric acid water solution at 5:5, and was hydrolyzed for 2 hours, was mixed at 1:1 with the dispersion liquid of Production Example 2, and was coated on the vapor deposition surface of the laminated body of Example 18 so as to

TABLE 1

| | Aqueous Solution Containing Fine Cellulose Fibers | | | | Evaluation | |
|---|---|---|---|---|---|---|
| | Fine Cellulose Fibers | | | | | |
| | Amount of Carboxyl Group [mmol/g] | Mass Ratio | Fiber Diameter [nm] | Other Components | Transmissivity [%] | Elastic Modulus [GPa] |
| Production Example 1 | 1.3 | — | 7000 | None | 0.1 | 2.8 |
| Production Example 2 | 1.6 | — | 2 | None | 95 | 22 |
| Production Example 3 | 2.4 | — | 55 | None | 70 | 8.8 |
| Production Example 4 | 1.6 | — | 2 | montmorillonite (500 nm) | 65 | 2.1 |
| Production Example 5 | 1.3 / 1.6 | 1 / 9 | 7000 / 2 | None | 68 | 18 |
| Production Example 6 | 1.3 / 1.6 | 5 / 5 | 7000 / 2 | None | 49 | 15 |
| Production Example 7 | 1.3 / 1.6 | 7.5 / 2.5 | 7000 / 2 | None | 18 | 6 |
| Production Example 8 | 1.3 / 1.6 | 9.5 / 0.5 | 7000 / 2 | None | 12 | 4 |

Examples 1 to 7

The respective dispersion liquids of Production Examples 1 to 7 were coated on the surfaces of ivory paper with a basis weight of 270 g/m$^2$ by a bar coater so as to have a film thickness of 500 nm, were dried in an oven of 120° C. for 3 minutes to make laminated bodies of Examples 1 to 7.

become 200 nm, and was dried in an oven at 120° C. for 3 minutes, to obtain a laminated body of Example 25.

Example 26

A polyethylene film with a thickness of 70 μm was further laminated on the coating surface of the laminated body of Example 25, using an urethane adhesive, to obtain a laminated body of Example 26.

Example 27

The dispersion liquid of Production Example 8 was coated on the surface of ivory paper with a basis weight of 270 g/m² by a bar coater so as to have a film thickness of 500 nm, were dried in an oven of 120° C. for 3 minutes to make a laminated body of Example 27.

Example 28

The dispersion liquid of Production Example 8 was coated on the surface of coated paper with a basis weight of 75 g/m² by a bar coater so as to have a film thickness of 200 nm, were dried in an oven of 120° C. for 3 minutes to make a laminated body of Example 28.

Comparative Example 1

Coated paper with a basis weight of 75 g/m² in which the fiber layer 2 is not formed was used as Comparative Example 1.

Comparative Example 2

Instead of the fiber layer 2, commercially available polyvinyl alcohol (molecular weight 100,000) was dissolved in water at a concentration of 1%, and coated on the coated paper with a basis weight of 75 g/m² similarly to Examples 8 to 14, to obtain a laminated body of Comparative Example 2.

Comparative Example 3

Instead of the fiber layer 2, commercially available polyvinyl alcohol (molecular weight 100,000) was dissolved in water at a concentration of 1%, and coated on the coated paper with a basis weight of 270 g/m² similarly to Examples 1 to 7, to obtain a laminated body of Comparative Example 3.

Comparative Example 4

A silicon oxide film of 50 nm was further laminated on the laminated body of Example 3 by vacuum vapor deposition, to obtain a laminated body of Comparative Example 4.

[Evaluation 1 of Examples and Comparative Examples]

With respect to the respective laminated bodies, oxygen permeability (unit: ml/m²·day·atm) was measured under the conditions of 30° C. and 70% RH using a MOCON method. The results are shown in Table 1.

As can be seen from the results shown in the table, if the oxygen permeability is within a range of 0.001 to 10 (ml/m²·day·atm), examples for which it can be said that there is a sufficient function to protect many contents that are sensitive to oxygen and that show the same performance as a barrier film from natural products of paper base and the cellulose fibers are obtained. Not only these examples can be disposed as paper, but also those examples that shield light besides oxygen gas due to coloring, printing, bonding, and metal vapor deposition in films until now can obtain equivalent performance with few processes. Additionally, since bonding of a metallic foil or the like is not performed, it is also possible to pass these through a metal locator. Additionally, leakage of gas or smell with the same size as that of oxygen can also be prevented.

[Evaluation 2 of Examples and Comparative Examples]

The oil-repellent degree of paper was evaluated on to the coating surfaces of the laminated bodies of Examples 8 to 14 and the coating surfaces of Comparative Examples 1 and 2, according to the JAPAN TAPPI paper pulp test method No. 41 (the kit method). As a result, in Comparative Examples 1 and 2, permeation was made in Kit Number 1. However, in the laminated bodies of Examples 8 and 10, permeation was not made until Kit Number 10. Additionally, with respect to Examples 9, and 11 to 14 permeation was not made until Kit Number 12. Hence, as to the oil resistance evaluated according to JAPAN TAPPI No. 41, it can be seen that that permeation is not made in Kit Number 10 or more.

[Evaluation 3 of Examples and Comparative Examples]

With respect to Examples 11, 12, 22, 23, 24, and 26 and Comparative Examples 1 and 2, water vapor permeability was measured by a cup method under the conditions of 40° C. and 90% RH. The results are shown in Table 2.

If the water vapor permeability under the conditions of 40° C. and 90% RH is within a range of 0.0000001 g/m²/day or more and 50 g/m₂/day or less, examples for which it can be said that there is a sufficient function to protect many contents that dislike water vapor and that show the same performance as a barrier film from natural products of the paper base and the cellulose fibers are obtained. Not only these examples can be disposed as paper, but also those examples that shield light besides water vapor due to coloring, printing, bonding, and metal vapor deposition in films until now can obtain equivalent performance with few processes. Additionally, since bonding of a metallic foil or the like is not performed, it is also possible to pass these through a metal locator. Leakage of gas or smell with the same size as that of water vapor or a permeation mechanism can also be prevented. Moreover, not only entry of water vapor from the outside can be prevented, but also drying of contents can be prevented or spoilage and loss of weight of contents due to evaporation of moisture can be prevented.

The results of Evaluations 1 to 3 of Examples and Comparative Examples are shown in Table 2.

TABLE 2

| | | | | | | | Evaluation | | |
|---|---|---|---|---|---|---|---|---|---|
| | Laminated Body | | | | | | Oxygen | Oil-Repellent Degree | Water |
| | Base | | Fiber Layer | | Other Layers | | Permeability | (Upper Limit | Vapor |
| | Type | Basis Weight [g/m²] | Dispersion Liquid | Film Thickness [nm] | Type | Film Thickness [nm] | (30° C. 70% RH) [cc/m²/day/atm] | of Non-Permeated Kit Number | Permeability [g/m²/day] |
| Example 1 | Ivory Paper | 270 | Production Example 1 | 500 | None | — | 12 | — | — |
| Example 2 | Ivory Paper | 270 | Production Example 2 | 500 | None | — | 15 | — | — |
| Example 3 | Ivory Paper | 270 | Production Example 3 | 500 | None | — | 8 | — | — |

TABLE 2-continued

| | Laminated Body | | | | | | Evaluation | | |
|---|---|---|---|---|---|---|---|---|---|
| | Base | | Fiber Layer | | Other Layers | | Oxygen Permeability | Oil-Repellent Degree | Water Vapor |
| | Type | Basis Weight [g/m²] | Dispersion Liquid | Film Thickness [nm] | Type | Film Thickness [nm] | (30° C. 70% RH) [cc/m²/day/atm] | (Upper Limit of Non-Permeated Kit Number) | Permeability [g/m²/day] |
| Example 4 | Ivory Paper | 270 | Production Example 4 | 500 | None | — | 3 | — | — |
| Example 5 | Ivory Paper | 270 | Production Example 5 | 500 | None | — | 6 | — | — |
| Example 6 | Ivory Paper | 270 | Production Example 6 | 500 | None | — | 5 | — | — |
| Example 7 | Ivory Paper | 270 | Production Example 7 | 500 | None | — | 6 | — | — |
| Example 8 | Coated Paper | 75 | Production Example 1 | 200 | None | — | 47 | 10 | — |
| Example 9 | Coated Paper | 75 | Production Example 2 | 200 | None | — | 55 | 12 | — |
| Example 10 | Coated Paper | 75 | Production Example 3 | 200 | None | — | 30 | 10 | — |
| Example 11 | Coated Paper | 75 | Production Example 4 | 200 | None | — | 4 | 12 | 861 |
| Example 12 | Coated Paper | 75 | Production Example 5 | 200 | None | — | 20 | 12 | 992 |
| Example 13 | Coated Paper | 75 | Production Example 6 | 200 | None | — | 22 | 12 | — |
| Example 14 | Coated Paper | 75 | Production Example 7 | 200 | None | — | 25 | 12 | — |
| Example 15 | Ivory Paper | 270 | Production Example 1 | 500 | Silicon Oxide Film | 50 | 1.5 | — | — |
| Example 16 | Ivory Paper | 270 | Production Example 2 | 500 | Silicon Oxide Film | 50 | 2.3 | — | — |
| Example 17 | Ivory Paper | 270 | Production Example 3 | 500 | Silicon Oxide Film | 50 | 0.5 | — | — |
| Example 18 | Ivory Paper | 270 | Production Example 4 | 500 | Silicon Oxide Film | 50 | 0.3 | — | — |
| Example 19 | Ivory Paper | 270 | Production Example 5 | 500 | Silicon Oxide Film | 50 | 0.3 | — | — |
| Example 20 | Ivory Paper | 270 | Production Example 6 | 500 | Silicon Oxide Film | 50 | 0.1 | — | — |
| Example 21 | Ivory Paper | 270 | Production Example 7 | 500 | Silicon Oxide Film | 50 | 0.2 | — | — |
| Example 22 | Ivory Paper | 270 | Production Example 3 | 500 | Polyethylene Film | 70 | 2 | — | 9 |
| Example 23 | Ivory Paper | 270 | Production Example 4 | 500 | Polyethylene Film | 70 | 1.2 | — | 5 |
| Example 24 | Ivory Paper | 270 | Production Example 4 | 500 | Silicon Oxide Film Polyethylene Film | 50 70 | 0.1 | — | 0.5 |
| Example 25 | Ivory Paper | 270 | Production Example 4 | 500 | Silicon Oxide Film Tetraethoxysilane Film | 50 200 | 0.1 | — | — |
| Example 26 | Ivory Paper | 270 | Production Example 4 | 500 | Silicon Oxide Film Tetraethoxysilane Film Polyethylene Film | 50 200 70 | 0.1 | — | 0.8 |
| Example 27 | Ivory Paper | 270 | Production Example 8 | 500 | None | — | 8 | — | — |
| Example 28 | Coated Paper | 75 | Production Example 8 | 200 | None | — | 27 | 12 | — |
| Comparative Example 1 | Coated Paper | 75 | None | — | None | — | 300 or more | 1 | 5320 |
| Comparative Example 2 | Coated Paper | 75 | None | — | Polyvinyl Alcohol Film | 200 | 300 or more | 1 | 4922 |
| Comparative Example 3 | Ivory Paper | 270 | None | — | Polyvinyl Alcohol Film | 500 | 135 | — | — |
| Comparative Example 4 | Ivory Paper | 270 | None | — | Polyvinyl Alcohol Film Silicon Oxide Film | 500 50 | 28 | — | — |

From the above results, it can be said that the laminated body of the invention has excellent barrier properties against oxygen, water vapor, and oil, and it is confirmed that a barrier material or a barrier container, which has high affinity and adhesion with the paper base, and also has various barrier properties against gas, an odor, a liquid, and drugs, or the like can be obtained by causing the fiber layer 2 containing the fine cellulose fibers to be formed on the base 1 made of paper.

Moreover, it is confirmed that a laminated body having excellent higher barrier properties can be obtained by providing a layer made of metal or metal oxide. Moreover, it is confirmed that defects of a layer made of metal or metal oxide can be prevented by including ultrafine fibers in the layer containing the fine cellulose fibers. Additionally, it is confirmed that, by including fibers or particles that have a certain range of diameter even among the fine fibers in the layer containing the fine cellulose fibers, the surface of the base can be efficiently reformed and an excellent laminated body can be obtained.

REFERENCE SIGNS LIST

1: BASE
2: FIBER LAYER
21: MIXED LAYER CONTAINING BASE COMPONENT AND FINE CELLULOSE FIBERS
22: MIXED LAYER CONTAINING FINE CELLULOSE FIBERS WITHOUT CONTAINING BASE COMPONENT
3: VAPOR DEPOSITION LAYER
4: RESIN LAYER OR SEALANT LAYER
100, 200, 300, 400, 500, 600: LAMINATED BODY

The invention claimed is:
1. A laminated body having a plurality of layers laminated thereon, the laminated body comprising:
a base made of paper;
a mixed layer directly laminated on the base so as to contact an entire surface of at least one side of the base and containing a base component of the base and fine cellulose fibers having fiber diameters of from 1 nm to 10 μm, the mixed layer having a thickness of from 10 nm to 2000 nm; and a cellulose layer not containing the base component but containing fine cellulose fibers having fiber diameters of from 1 nm to 10 µm, wherein the mixed layer and the cellulose layer are respective portions of a fiber layer included in the laminated body, the fiber layer contains fine cellulose fibers, having fiber diameters of from 1 nm to 30 nm, in an amount of from 10 mass % to 99 mass % with respect to a mass of the fiber layer, and the fiber layer contains fine cellulose fibers, having fiber diameters of from 100 nm to 10 µm, in an amount of from 1 mass % to 90 mass % with respect to the mass of the fiber layer.

2. The laminated body according to claim 1, wherein the fine cellulose fibers have a crystallinity of from 70% to 100%.

3. The laminated body according to claim 2, wherein the fine cellulose fibers have from 0.1 mmol/g to 3.5 mmol/g of a carboxyl group with respect to cellulose mass.

4. The laminated body according to claim 3, wherein a bending elastic modulus of the fiber layer is from 2 GPa to 30 GPa.

5. The laminated body according to claim 4, wherein an arithmetic mean roughness (Ra) of the surface of the fiber layer is from 100 nm to 2000 nm.

6. The laminated body according to claim 5, wherein a thickness of the fiber layer is from 100 nm to 2000 nm.

7. The laminated body according to claim 6, wherein oxygen permeability at a temperature of 30° C. and at a humidity of 70% is within a range of from 0.001 cm$^3$/m$^2$·atm·day to 10 cm$^3$/m$^2$·atm·day.

8. The laminated body according to claim 6, wherein water vapor permeability at a temperature of 40° C. and at a humidity of 90% is within a range of from 0.0000001 g/m$^2$/day to 50 g/m$^2$/day.

9. The laminated body according to claim 6, wherein oil resistance evaluated according to the JAPAN TAPPI paper pulp test method No. 41 has a kit number of 10 or more.

10. The laminated body according to claim 1, wherein the fiber layer further contains an inorganic layered mineral.

11. The laminated body according to claim 1, wherein the fiber layer further contains a composite material with a silica compound, shown in the following General Formula (1), or its hydrolyzate, and in the following General Formula (1), X1, X2, X3, and X4 are the same or are different from each other, and are any one of a hydroxyl group, an alkoxy group, and an alkyl group:

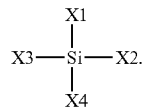

[General Formula (1)]

12. The laminated body according to claim 1, wherein the fiber layer and a thin film layer made of metal or metal oxide are provided on at least one surface of the base.

13. The laminated body according to claim 1, further comprising a resin layer or a sealant layer.

14. A molded container using the laminated body according to claim 1.

* * * * *